Patented July 5, 1949

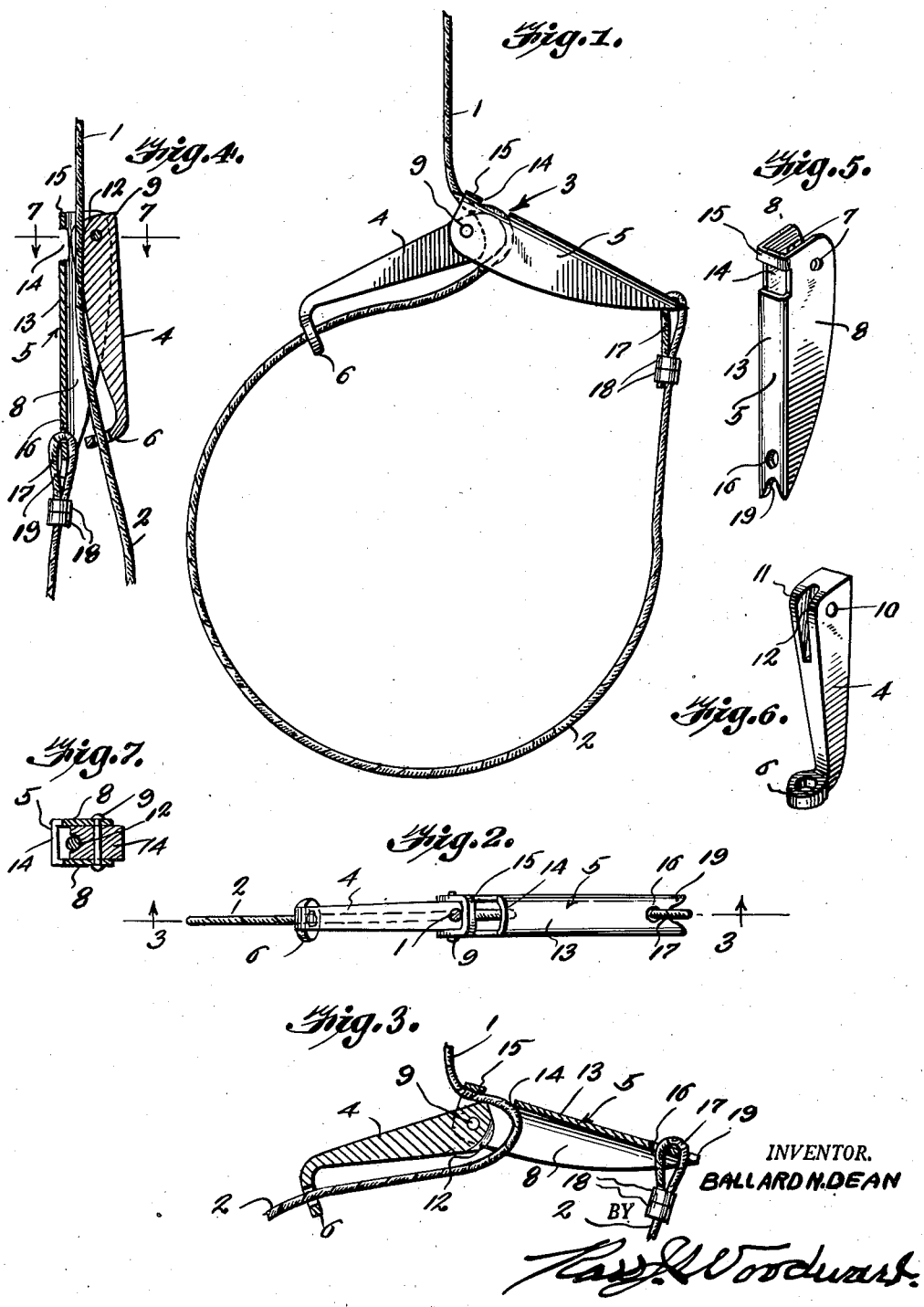

2,474,933

UNITED STATES PATENT OFFICE 2,474,933

ANIMAL SNARE

Ballard N. Dean, Renton, Wash.

Application February 27, 1947, Serial No. 731,212

4 Claims. (Cl. 43—87)

This invention relates to a snare used for catching animals and consisting of a length of flexible wire having one end portion formed with a loop for engaging about an animal to be caught and either killing the animal by choking it to death or holding the animal captive until removed from the snare by the person who set the snare.

Another object of the invention is to provide the snare with an improved device serving as means for forming a loop of an end portion of a length of twisted wire and also serving as means for tightly gripping the wire and preventing slippage which would prevent a leg or head of an animal from readily passing through the loop.

Another object of the invention is to provide a snare with a loop-forming member of such construction that while it may have tight gripping engagement with the wire after a loop of desired size has been formed, pull exerted by a caught animal will cause the loop forming device to be moved to a releasing position and thus allow the loop to be contracted by pull tightly about the leg or neck of the caught animal.

Another object of the invention is to provide a loop forming member consisting of wire engaging levers so formed that while the wire will be firmly gripped it may be released when pull is exerted by a caught animal even if the gripping levers or arms become coated with ice.

Another object of the invention is to provide a snare which is simple in construction, efficient in operation, and capable of being manufactured at small cost.

The invention is illustrated in the accompanying drawings wherein:

Fig. 1 is a perspective view showing the improved snare set to form a loop of desired size.

Fig. 2 is a view looking down upon Figure 1.

Fig. 3 is a sectional view taken longitudinally through the loop-forming and securing member along line 3—3 of Figure 2.

Fig. 4 is a sectional view showing the levers or arms of the loop-forming member in the released position.

Fig. 5 is a perspective view of one of the levers.

Fig. 6 is a perspective view of the other lever.

Fig. 7 is a transverse sectional view taken along the line 7—7 of Figure 4.

The improved snare constituting the subject matter of this invention is formed from flexible wire cable 1 which may be of any desired length and preferably consists of twisted wire strands so that it will be strong enough to hold a caught animal and not be liable to be bitten through if the animal attempts to sever the cable with its teeth. One end portion of the wire cable is formed with a loop 2 which is to be contracted or tightened about an animal's neck or leg and firmly hold the animal until it is choked to death or removed from the loop by the owner of the snare.

In order to hold the loop open and maintain it of a desired size there has been provided a keeper or retainer 3 which is mounted as shown in Figure 1 and consists of companion levers 4 and 5. The lever 4 is formed from a solid piece of hard metal and at its outer end carries an eye 6 which extends downwardly from the lever at right angles thereto and through which the wire cable slidably passes. The inner end of the lever 4 fits between side walls of the lever 5, which is formed of stiff sheet metal, and referring to Figure 5 it will be seen that the blank from which lever 5 is formed is bent to provide a lever which is U-shaped in cross section. Openings 7 are formed through the side walls of lever 5 to receive a pin 9 which also passes through an opening 10 formed through the inner end portion of lever 4 and mounts the levers for tilting movement relative to each other. The inner corner portion of the inner end portion of the lever 4 is rounded as shown at 11, and across this rounded corner of the lever extends a groove 12 which extends longitudinally of the lever and is provided to receive a portion of the cable and allow the levers to be swung from the folded or released portion shown in Figure 4 to the extended or gripping position shown in Figure 1. The cable extends between the pivotally connected inner ends of the levers 4 and 5. The flat wall 13 of the lever 5 is formed with an opening 14 near its inner end so that a portion of the cable may enter the opening as the bridge 15, formed by the portion of the wall 13 between the opening 14 and the inner end of the lever 5, moves along the inner end of the lever 4 into position to cause the cable to be gripped between the two levers. Since a portion of the cable enters the opening 14, the cable may be firmly gripped without the cable being scored and weakened by contact with the main portion of the wall 13. The opening 14 also allows snow and ice to escape from between the jaws as the jaws are moved to a gripping position and firm gripping of the cable will not be interfered with by any snow or ice which may have accumulated between the two jaws. Near its outer end the wall 13 of the lever 5 is formed with an opening 16 to receive an eye 17 formed by looping one end of the cable and securing it by a flattened metal band 18, and in order to prevent the eye from slipping toward a position at one side of the lever there has been provided a notch 19 in which a portion of the eye engages.

When the snare is in use the cable is slid through the eye 6 until a loop of the desired size has been formed and the levers or jaws 4 and 5 of the fastener 3 are then grasped by their outer end portions and swung from the position shown in Figure 4 toward the securing position shown in Figure 1. As the jaws or levers are swung away from each other the cross bar 15 moves along the inner end portion of the lever 4 and the portion of the cable under this cross bar or inner end of the lever 5 will be tightly gripped between the levers. This will prevent the cable from slipping and the loop will be held in the adjusted condition. The loop will then be placed upon the ground in a runway or trail used by animals and the other end of the cable suitably secured, or the cable may be suspended from a tree limb or other overhead support with the loop disposed in such position that an animal running along the trail or runway will pass its head through the loop. When an animal steps into the loop or its head passes through the loop pull will be exerted and this pull will cause the levers to be swung toward each other toward the releasing position shown in Figure 4 and the cable may then slide freely through the eye 6 and between the connected ends of the levers until the loop is contracted about the animal's leg or neck and the animal will be securely held and choked to death if caught about its neck. When the owner of the snare finds an animal caught it is merely necessary to slide the collapsed fastener 3 along the cable and thus enlarge the loop so that the animal may be removed and the levers again be moved to the gripping position for resetting the snare.

Having thus described the invention, what is claimed is:

1. A snare comprising a length of flexible metal cable having an eye formed at one end, and a fastener consisting of companion levers, one lever being formed of solid metal and having an outer end formed with an eye disposed at right angles to the lever and through which the cable slidably passes, the other lever being formed of stiff sheet metal and being U-shaped in cross section to provide a bridge and side walls, the inner end portion of the first lever being disposed between inner end portions of the side walls of the second lever, a pin passing through registering openings formed in the first lever and side walls of the second lever to pivotally connect the levers from a closed position to an extended position, said cable having a portion slidably passing between the inner end of the first lever and the inner end portion of the second lever, the said inner end of the first lever having a rounded corner and being formed with a longitudinally extending groove crossing the rounded corner and adapted to receive a portion of the cable, the outer end of the second lever being formed with an opening and with a recess through which the eye of the cable passes to form a loop for the cable, and the inner end portion of the second lever having its bridge formed with an opening for receiving a portion of the cable when the levers are swung away from each other to a gripping position, the portion of the bridge between its inner end and the adjacent opening constituting a cross bar for tightly holding the cable pressed against the inner end of the first lever and tightly gripped to retain the loop end of desired size.

2. A snare comprising a cable formed of flexible wire and having an eye at one end, and a fastener for holding an end portion of the cable in looped formation, said fastener consisting of companion levers, one lever having an outer end formed with an eye through which the cable slidably passes and the other lever having its inner end portion disposed in straddling relation to the inner end portion of the first lever and pivoted thereto to mount the levers for swinging movement from a closed position longitudinally of each other to an extended position, said cable slidably passing between the inner end portions of the levers with a portion engaged across the inner end of the first lever in position to be gripped between inner ends of the levers when the levers are swung to the extended position, and the outer end of the second lever being formed with an opening through which the eye of the cable is mounted to the cable into a loop.

3. A snare comprising a cable, and a fastener consisting of levers having inner end portions pivoted to each other, one lever having its outer end formed with an eye, said cable slidably passing between inner ends of the levers and through said eye and having an end formed with an eye engaged through an opening at the outer end of the second lever to form a noose of the said end portion of the cable, the inner end of the first lever being formed with a groove to receive the cable and the inner end portion of the second lever being formed with an opening to receive a portion of the cable and prevent abrupt bending of the cable when the inner end portion of the second lever is moved along the first lever into position for causing gripping of the cable between the levers to form a noose of predetermined size.

4. A snare comprising a flexible cable, and a fastener carried by the cable and consisting of companion jaws having inner end portions pivoted to each other, said cable slidably passing through the space between inner ends of the jaws and through an eye carried by one jaw and having its end connected with the outer end of the second jaw to form a noose of the end portion of the cable, the second jaw having its inner end portion formed with an opening for receiving a portion of the cable and preventing abrupt bending of the cable when the jaws are swung to a position disposing inner end of the jaws in gripping engagement with the cable to retain the noose a desired size.

BALLARD N. DEAN.

REFERENCES CITED

The following references are of record in the file of this patent:

UNITED STATES PATENTS

| Number | Name | Date |
|---|---|---|
| 779,172 | Mathis | Jan. 3, 1905 |
| 1,671,414 | Durand | May 29, 1928 |
| 1,800,095 | Nakagawa | Apr. 7, 1931 |